United States Patent [19]
Slavejkov et al.

[11] Patent Number: 5,346,390
[45] Date of Patent: Sep. 13, 1994

[54] METHOD AND APPARATUS FOR OXY-FUEL HEATING WITH LOWERED $NO_x$ IN HIGH TEMPERATURE CORROSIVE ENVIRONMENTS

[75] Inventors: Aleksandar G. Slavejkov, Allentown; Zbigniew Zurecki, Macungie, both of Pa.; Mahendra L. Joshi, Altamonte Springs; James K. Nabors, Apopka, both of Fla.

[73] Assignees: Air Products and Chemicals, Inc., Allentown, Pa.; Combustion Tech, Inc, Apopka, Fla.

[21] Appl. No.: 108,030

[22] Filed: Aug. 17, 1993

Related U.S. Application Data

[62] Division of Ser. No. 860,652, Mar. 30, 1992, Pat. No. 5,256,058.

[51] Int. Cl.⁵ ............................................. F23M 3/02
[52] U.S. Cl. ........................................ 431/8; 431/10
[58] Field of Search ............. 431/353, 284, 187, 188, 431/351, 8, 10

[56] References Cited

U.S. PATENT DOCUMENTS

| | | | |
|---|---|---|---|
| 2,518,025 | 8/1950 | Knight | 431/187 |
| 3,092,166 | 6/1963 | Shepherd | 431/353 |
| 3,856,457 | 12/1974 | Miller | 431/353 |
| 4,378,205 | 3/1983 | Anderson | 431/5 |
| 4,541,796 | 9/1985 | Anderson | 431/187 |
| 4,690,635 | 9/1987 | Coppen | 431/187 |
| 4,797,087 | 1/1989 | Gitman | 431/10 |
| 5,100,313 | 3/1992 | Anderson et al. | 431/8 |
| 5,104,310 | 4/1992 | Saltin | 431/10 |
| 5,256,058 | 10/1993 | Slavejkov et al. | 431/187 |

OTHER PUBLICATIONS

D. E. Shamp & D. H. Davis; Application of 100% Oxygen Firing at Parkersburg, W.V., pp. 218-239.
D. E. Shamp & D. H. Davis; Oxygen Firing at . . . pp. 6-13 Dec. 1990 American Glass Review.

*Primary Examiner*—Carroll B. Dority
*Attorney, Agent, or Firm*—James C. Simmons; William F. Marsh

[57] ABSTRACT

Method and apparatus for generating an oxy-fuel flame with lowered NOX products by confining the oxy-fuel flame produced in a concentric orifice burner along a path defined by the rate of flame propagation and the diameter of the burner.

6 Claims, 4 Drawing Sheets

FIG. 2a PRIOR ART
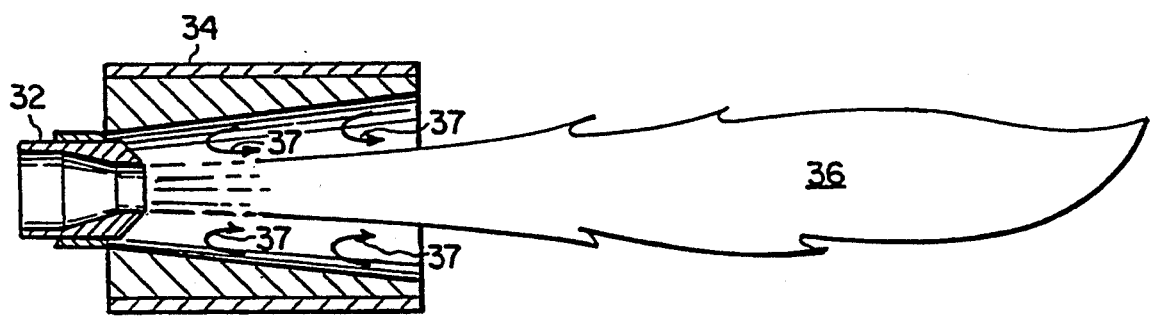
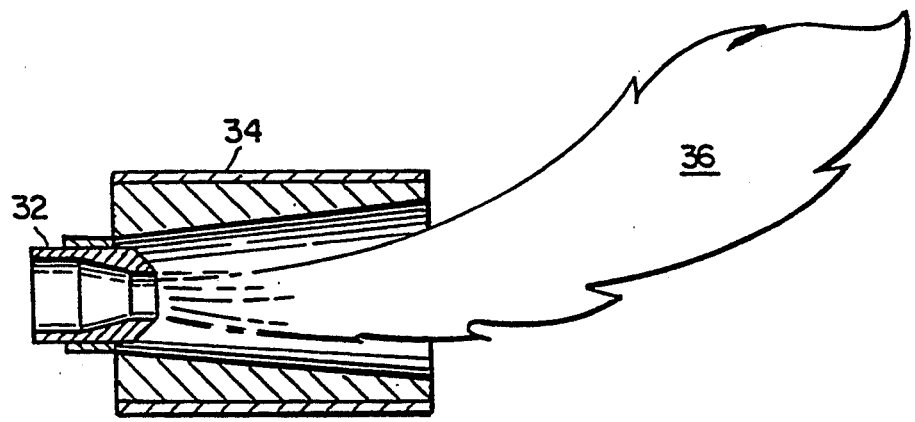
FIG. 2b PRIOR ART 5,346,390

METHOD AND APPARATUS FOR OXY-FUEL HEATING WITH LOWERED NO$_x$ IN HIGH TEMPERATURE CORROSIVE ENVIRONMENTS

This application is a division of application Ser. No. 07/860,652 filed Mar. 30, 1992 now U.S. Pat. No. 5,256,058.

FIELD OF THE INVENTION

The present invention pertains to oxygen-fuel heating processes and apparatus used for producing elevated temperatures in industrial melting furnaces for such diverse products as metals, glass, ceramic materials and the like.

BACKGROUND OF THE INVENTION

In completely or partially combustion heated high-temperature furnaces such as a glass melting furnace, pollution is a frequently encountered problem. High emission levels of pollutants such as oxides of nitrogen (NO$_x$), sulfur dioxide (SO$_2$), carbon dioxide, and particulates, which often exceed the maximum levels permitted by the Environmental Protection Agency Regulations, are typical for furnaces with air-fuel fired and oxygen enriched air-fuel fired burners.

In the past, the problem has been addressed by using post-combustion pollutant reduction techniques. However, these processes require equipment that makes the solution extremely capital intensive and costly to operate.

Another and more efficient method is using oxygen in the combustion process to eliminate nitrogen from the air and reduce the NO$_x$ and particulate emissions to below the guidelines suggested by the Environmental Protection Agency. In addition, the use of oxygen in combustion reduces carbon dioxide emission through an increase in heating efficiency of the furnace and brings numerous other benefits ranging from increased production capacity to savings in batch chemicals.

Oxygen-fuel burners may be divided into two major groups, those that are water cooled and those that are gas cooled. A frequently en-countered problem with the burners of either group is the lack of a diluent and carrier gas, e.g., nitrogen, which increases partial pressures of volatile batch components and accelerates corrosion rates of metallic and ceramic materials used for burner construction. Thus, build-up and corrosion on water or gas cooled burner nozzles are the most common problems in high temperature furnaces. A large temperature difference between the cooled burner nozzles and furnace gases causes condensation of volatile and corrosive species and build-up on the burner nozzle. This is reported in an article entitled "Oxygen Firing at Parkersburg" by D. Shamp and D. Davis in the December 1990 edition of American Glass Review. In gas cooled or water cooled burners where the water cooling is not at optimum flow rates, building on the nozzles can cause flame deflection and im-pingement on the burner nozzle leading to damage or destruction of the burner.

A second problem encountered with water and gas cooled oxy-fuel burners is the fact that the refractory burner block, often used to enable installation of the burner into a furnace and/or to increase flame stability, involves an opening with an inner diameter much larger than the flame jet diameter causing entrainment of corrosive furnace gases or particulate material inside the block and contact with the burner. This type of burner is shown in U.S. Pat. No. 4,690,634.

Another problem, to both the water and gas cooled burners is low flame luminosity because of a high burning velocity and rapid mixing rates encountered in such combustion systems. This decreases the heating efficiency since radiation is the major heat transfer mechanism in a high temperature furnace such as a glass melting furnace.

In addition, water cooled oxy-fuel burners require capital investment and maintenance. Such burners may lower the overall heating efficiency of a furnace by extracting considerable heat from it with the flow of cooling water. For example, for a burner cooling water flow rate of 5 gallons per minute, and output to input water temperature difference of 50° F., heat loss per burner is approximately 125,000 Btu's per hour. For a 10-burner furnace the heat loss due to the water-cooling amounts to about $30,000 per year. In addition, there is always the possibility of water leakage into the furnace if a burner is not maintained properly and there is a risk of clogging and corrosion of the burner water cooling channels if poor water quality is the only means of cooling available to the user.

Gas-cooled oxy-fuel burners can present a problem in the case of interruption in the fuel or oxygen supply. Such burners have to be immediately removed from the firing port in the furnace to prevent possible damage from the high temperature present in the furnace. If such burners rely upon metal fins at the burner face to cool the burner, these fins can collect condensation and result in corrosion problems with the burner.

SUMMARY OF THE INVENTION

The present invention pertains to a method and apparatus for utilizing oxy-fuel heating in a high temperature production furnace such as a glass melting furnace. The flame is created by shielding a fuel rich oxy-fuel flame inside of a sheath of a fuel lean or oxygen rich oxy-fuel flame and confining the shielding of the flame along a predetermined path having a predetermined cross-section to achieve the results of two phase turbulent diffusion flame production in a precombustor so that aspiration of corrosive species leading to burner destruction is prevented and generation of NO$_x$ is reduced.

BRIEF DESCRIPTION OF THE DRAWING

FIGS. 2a and 2b are schematic representations of a prior art oxy-fuel burner and burner block of the diverging type showing the effect of velocity on the flame shape.

DETAILED DESCRIPTION OF THE INVENTION

As stated above, prior art oxy-fuel burners have been used to heat industrial furnaces with a view toward overcoming problems with conventional air-fuel burners. In the context of this invention, the term oxy or oxygen is taken to mean any gaseous oxidizer having more than 30% oxygen. In other words, in the context in the present invention, oxy or oxygen-fuel includes all oxidizers except air. Furthermore, in the context of the present invention fuels are taken to mean the normally gaseous fuels including, but not limited to, methane, natural gas, propane and the like, as well as liquid fuels, such as fuel oils, heating oils, waste oils, slurries, and the like, to name but a few.

Figure 1A:
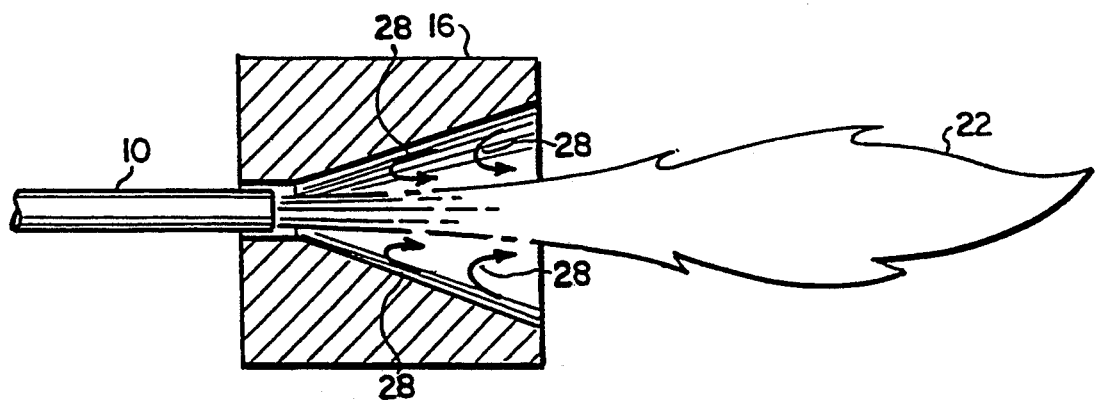
FIGS. 1a, 1b, and 1c are schematic representations of prior art oxy-fuel burners and the burner block used to mount the burner into the heating furnace showing respectively, a diverging burner block nozzle, a large diameter cylindrical nozzle and a small diameter cylindrical nozzle.
Figure 1B:
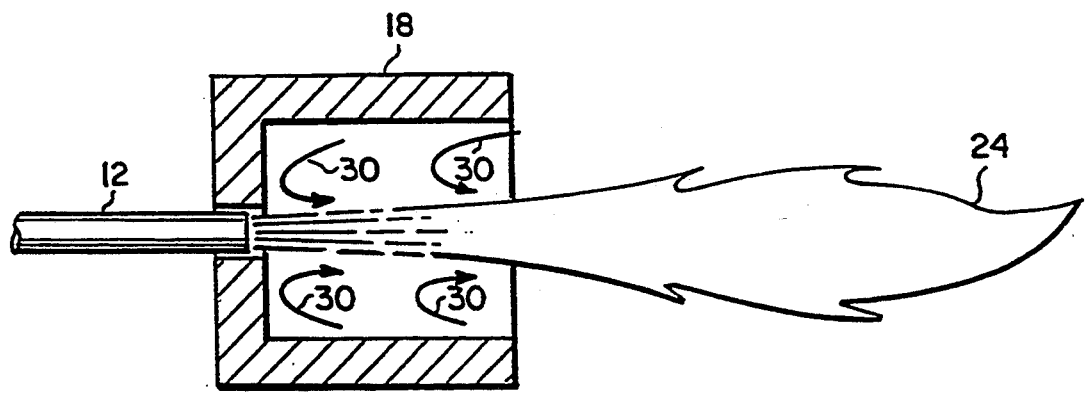
Figure 1C:
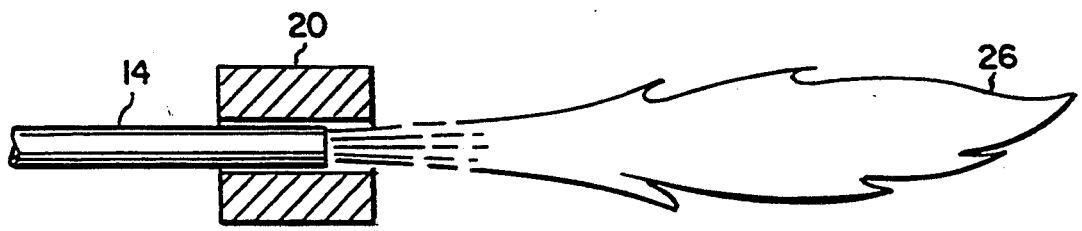

As shown in FIGS. 1a, 1b, and 1c, prior art burners could employ an oxy-fuel burner 10, 12 or 14 and a diverging 16, large diameter cylindrical 18 or small diameter cylindrical 20 burner block. In the case of the devices of FIGS. 1a, 1b and 1c, the flame shape 22, 24 and 26 is generally the same. In the case of the diverging nozzle or burner block 16, and the large diameter burner block 18, the shape of the nozzle causes aspiration of atmosphere contained inside the furnace into the flame as shown by the arrows 28 and 30 respectively. This is also discussed in the text of U.S. Pat. No. 4,690,635. The larger diameter opening in the burner blocks 16, 18 in combination with high fuel and/or oxygen jet velocities used to keep the high temperature flame away from the metallic or refractory burner materials induces a substantial recirculation and entrainment of the furnace gases and particulates into the burner blocks causing build-up and corrosion as discussed by patentees in U.S. Pat. Nos. 4,378,205 and 4,541,796. The build-up in the burner blocks can alter flame direction, shape and stability and may result in localized increase in flame temperatures and rapid destruction of the burner. Furthermore, build-up or constriction in a nozzle exit area may cause undesirable pressure increase in the input gas. In zone-control furnaces, this pressure imbalance could cause uneven heat distribution to the load as well as control difficulties. In order to assure survival when exposed to high oxy-fuel flame temperatures, some burner blocks are made from very expensive high temperature ceramic materials such as stabilized zirconia ($ZrO_2$). Such materials are usually not corrosion resistant and of low durability in glass melting environments as disclosed by the authors Shamp and Davis in the article referred to above. An alternative to a refractory block is a water cooled metal block such as shown and described in U.S. Pat. No. 4,797,087. However, operating problems with this type burner similar to those experienced with water or gas cooled nozzles are to be expected in a chemically aggressive furnace environment.

Furthermore, low flame luminosity is typical for oxygen-natural gas burners because of the high burning velocity and rapid mixing rates of such combustion systems. This decreases the heating efficiency since radiation is the major heat transfer mechanism in a high temperature furnace such as a glass melter.

Use of a small diameter burner block such as shown in FIG. 1C will minimize the entrainment problem, but will not eliminate some of the other problems inherent with prior art burner blocks.

As shown in FIG. 2a, if a prior art oxy-fuel burner 32 is used with a diverging nozzle or burner block 34 and there is high momentum in the combustion process a non-luminous flame 36 is produced. The non-luminous flame 36 will be less efficient in heating the furnace and the materials therein because of the inherent poor heat transfer characteristics as discussed above. If the burner 32 procedure a low momentum oxy-fuel flame, the flame 36 becomes luminous but at the same time the flame will tend to lift toward the roof of the furnace or vessel being heated as shown in FIG. 2b. Allowing the flame to lift and thereby cause localized heating will seriously decrease the life of the roof refractories in a melting device such as the furnace crown in a conventional glass melting furnace or glass melter.

Figure 3:
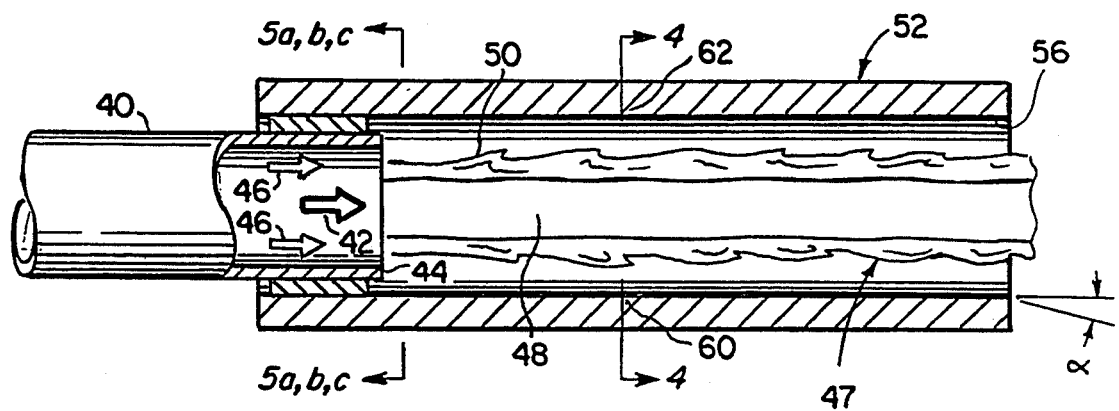
FIG. 3 is a schematic representation of the apparatus of the present invention.
Figure 5A:
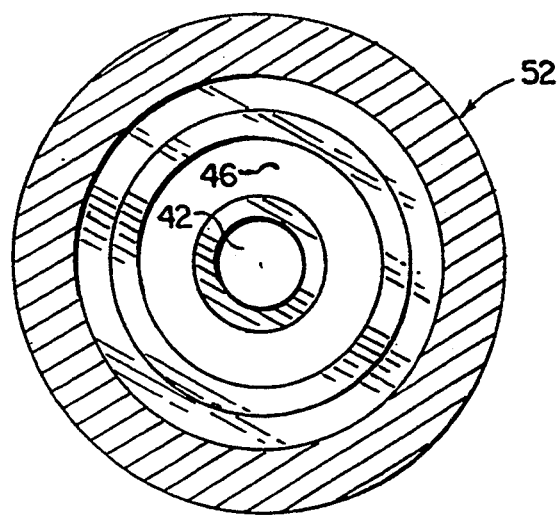
FIGS. 5a, 5b, 5c are various embodiments of a section taken along line 5, a, b, c—5, a, b, c of FIG. 3.
Figure 5B:
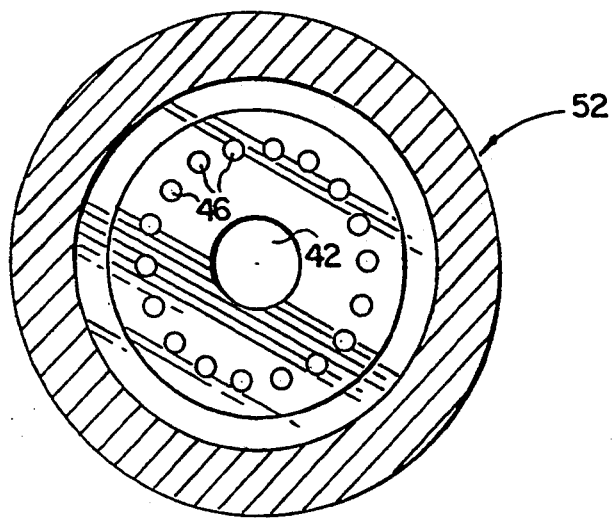
Figure 5C:
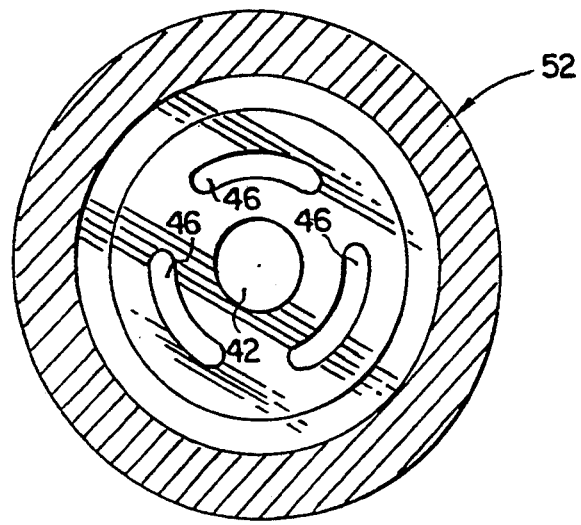

As shown in FIG. 3, Applicants have discovered that when an oxyfuel burner 40 of the type that uses a central aperture shown by arrow 42 for introduction of a fuel such as natural gas forward of the face 44 of the burner 40 and a concentric aperture or a plurality of concentric apertures as shown by arrows 46 to introduce oxygen or an oxidizer around the fuel at the face 44 of the burner and a source of ignition is provided, a flame 47 is created. As shown in FIGS. 5a, 5b, and 5c the face 44 of the burner 40 contains a central aperature 42 for introduction of the fuel forward of the face 44 of the burner 40. Surrounding fuel aperture 42 is a concentric aperture 46 which can be formed as an annulus as shown in FIG. 5a, a plurality of apertures 46 shown in FIG. 5b, or a plurality of slots 46 shown in FIG. 5c to introduce oxygen or an oxidizer around the fuel at the face 44 of burner 40. Flame 47 comprises a core 48 of a fuel rich oxy-fuel mixture surrounded by a sheath of a fuel lean or oxygen rich mixture 50. Confining the oxy-fuel flame thus produced in a precombustor or a nozzle 52 such as shown, achieves the effect of a luminous flame of low temperature with reduced $NO_x$ production and eliminates entrainment of harmful furnace contaminants into the nozzle, burner block or precombustor 52.

Applicants have discovered that the geometry of the precombustor 52 is a function of the firing rate. For example, if the burner 40 is capable of firing at a rate of between 0.25 and 40 million Btu per hour, the dimensions of the precombustor 52 should be such that the distance or length from the face of the burner 44 to the discharge end 54 of the precombustor 52 is between 6 inches and 48 inches, the diameter of the interior cylindrical aperture or passage of the precombustor 52 should be between 2 inches and 8 inches and the ratio of length to diameter (L/d) should be between 2 and 6. In accord with the invention, the preferred precombustor configurations are shown in Table 1 below.

TABLE 1

| Firing Rate Range | Turndown | Length (L) | Diameter (d) | L/d Ratio |
| --- | --- | --- | --- | --- |
| 0.25–1.5 MM | 6 | 12–18" | 3.0–3.5" | 3.4–5.1 |
| 1.0–3.0 MM | 3 | 12–18" | 3.5–4.0" | 3.0–4.5 |
| 2.0–6.0 MM | 3 | 12–18" | 4.0–4.5" | 2.8–4.0 |
| 4.0–20.0 MM | 5 | 16–48" | 4.0–8.0" | 2.0–6.0 |

The numbers given in the table above are empirical values derived from the measurements of flame luminosity, precombustor temperature profile, and precombustor pressure collected during experimental test firing. These dimensions go against the traditional approaches in designing burners and burner blocks since this "tight" precombustor is actually cooled and shielded by the flowing and reacting gases. As used herein "tight" refers to a small clearance between the outer diameter of the flame 47 and the inner diameter of the precombustor 52. In the prior art, the burner blocks were large to keep them away from the hot oxy/fuel flame which resulted in the entrainment of the furnaces gases.

It has also been discovered that the precombustor can have a converging or diverging shape to the inner surface 56, provided that the angle of convergence or divergence is no greater than plus or minus 15°, the angle being measured relative to the longitudinal axis of the precombustor 52. The angle is shown as $\alpha$ in FIG. 3 of the drawing.

Figure 4:
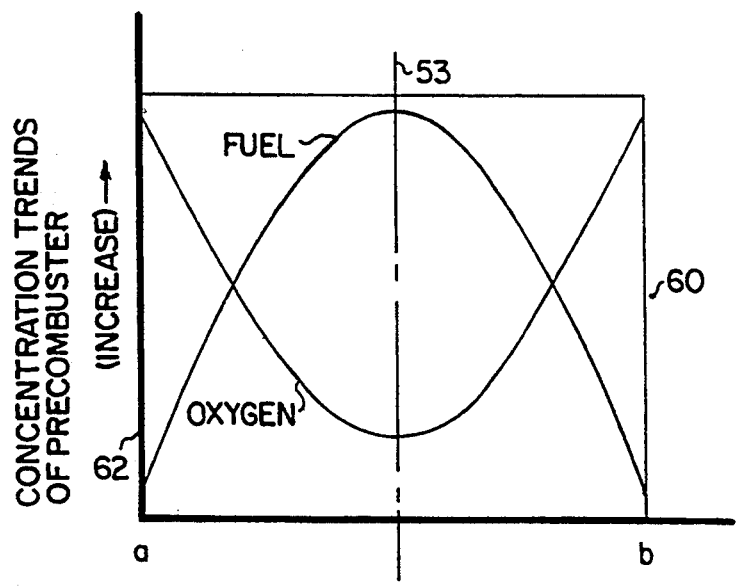
FIG. 4 is a plot of distance from the centerline to radially opposed points on the inner surface of the precombustor of the present invention against the concentrations of oxy-fuel mixtures in the precombustor.

Referring to FIG. 4, there is a plot of the distance from the transverse centerline 58 of the precombustor 52 to equally spaced locations 60, 62 on the inner wall 56 of precombustor 52 against the concentration trends of oxygen and fuel mixtures in the precombustor 52.

As shown in FIG. 4 at the centerline of the burner the tendency is for a higher concentration of fuel than oxygen. The reverse trend is true at the wall of the precombustor 52, thus showing that the use of the concentric oxy-fuel burner produces a fuel rich phase or zone within a oxygen rich or fuel deficient zone or phase, thus creating the two-phase turbulent diffusion flame.

The present invention enables formation and stabilization of a twophase turbulent diffusion flame and its introduction into a furnace without any aspiration of the furnace gases into the precombustor 52. The flame 47 is stabilized within the precombustor 52 and extends into a furnace (not shown) through the projecting end 54 of the precombustor 52. The center core 48 (fuel rich phase) of the flame 47 is luminous and at high temperature and does not come into contact with the walls 56 of the precombustor 52. The cooler annular sheath 50 or oxygen-rich place (fuel-lean phase) surrounds the luminous center core 48 of the flame 47, cools and protects the precombustor 52 walls 56 from high flame temperatures and prevents any aspiration of furnace gases into the precombustor 52. The products of combustion from this two-phase flame include soot particles which were produced by fuel cracking and gas phase nucleation process within the precombustor 52. Oxidation of soot with remaining fuel inside the furnace gives a very luminous flame suitable for efficient radiative heat transfer to the article or load being heated.

It has been found that for proper operation of the precombustor 52, the nozzle velocities, e.g. the velocity at the face 44 of the burner 40 of natural gas ($v_{ng}$) and oxygen ($v_{ox}$), should not be higher than about 600 feet per second, and the ratio of $V_{ng}/V_{ox}$ should be between 0.3 and 6.0. However, for the high flame luminosity (preferred operation) when using the apparatus of the present invention lower velocities should be used, with the $V_{ng}/V_{ox}$ ratio being between 1.0 and 1.5. Depending upon the heating application the precombustor may be further divided into the high momentum and low momentum version which would correspond to the high and low and specified velocity ranges. For example, in a partial-conversion furnace with both oxy-fuel and air fuel burners, the high momentum operation would be required to minimize the effect of air fuel burners and large flue gas volumes on the oxy-fuel flame shape stability. On the other hand, in a full conversion oxy-fuel furnace, low-momentum is preferable since this regime offers lower flame temperatures and higher flame luminosity.

The precombustor can be used where the burner is fired outside of the stoichiometric ratio, for example in a staged combustion process. When less than 50% of needed oxygen is injected through the burner into the precombustor (e.g. oxygen/natural gas is less than 1/1) oxygen and fuel may be introduced in a reversed configuration and the fuel flow used for the precombustor cooling.

When the specified design and operating ranges are used as set out above, the precombustor 52 of the present invention operates at lower temperatures than those typically found in a high temperature furnace. This being a surprising result gives the burner or furnace operator a wide latitude since no special materials are required except those compatible with the materials normally used in construction of a given furnace.

If in fact the operating or design parameters are not observed, for example, a precombustor is used where the L/d ratio is less than 2, the diameter of the precombustor becomes too large which does not permit production of the two-phase flame within the precombustor. In addition, high nozzle velocities are needed to prevent the flame from curving up and overheating the furnace roof refractories such as shown in FIG. 2B. Thus, a high turbulent flow is required causing intense oxygen-fuel mixing, high flame temperatures and aspiration of furnace gases into the combustor. This would be the case if the precombustor was used as a conventional small diameter burner block such as shown in FIG. 1c.

On the other hand, if the L/d ratio is greater than 6, the precombustor diameter is too small or the length is too large which leads to unacceptably high flame temperature within the precombustor. This also may induce too large a temperature gradient between the ends of the precombustor and promote crack propagation within the material of construction of the precombustor 52.

A device according to the present invention was tested where the precombustor 52 had a passage with an L/d ratio of 3.2. Temperature of the furnace into which the precombustor was installed was maintained at about 2400° F. for a twenty-four hour time period. During the test, temperature of several burner components (e.g. nozzle, mounting plate, precombustor) were monitored. In addition, pressure in the back of the burner block was measured. The recorded temperatures under steady state conditions of a firing rate of 1.6 million Btu per hour were: an average furnace temperature of 2,410° F., an average precombustor temperature at the nozzle end 44 of 1,580° F. and at the discharge end 54 or furnace end 1,970° F. Static pressure measured in back of the precombustor was above atmospheric for firing rates above 1 million Btu per hour. This indicates that there was no aspiration of furnace gases into the precombustor, since the furnace was operated at a slightly negative pressure. Flame luminosity was high up to 3 million Btu per hour above which it gradually decreased.

In addition to the foregoing, precombustor being an L/d of 4 fabricated of the same material as furnace walls was tested in a fully oxygen/natural gas fired fiberglass melting furnace. The precombustor was installed near the batch charge side through a furnace wall which was at 2,204° F. temperature before the start of the test. During the entire test, using the device of the present invention, the temperature of the precombustor face and the surrounding furnace wall refractories decreased by about 50° F. several hours after the start of firing, thus demonstrating the effectiveness of oxygen cooling and protecting furnace refractories. Flame luminosity was high up to a firing rate of 1.5 million Btu per hour. After five weeks of continuous operation at firing rates ranging between 1 and 2.5 million Btu per hour, the precombustor was inspected and found to be clean, without any signs of corrosion or deposition on the face or walls of the inner chamber. The nozzle of the burner used for injection of natural gas and oxygen was also found to be without any signs of build-up or corrosion.

Having thus described our invention what is desired to be secured by Letters Patent of the United States is set forth in the appended claims.

We claim:

1. A method of producing a low NOX oxy-fuel flame for heating a chamber to an elevated temperature comprising the steps of:

producing an oxy-fuel flame of the type wherein a core of a fuel rich phase is surrounded by a sheath of a fuel lean phase by using a post mix concentric tube oxy-fuel burner to produce said flame by causing fuel to exit a central tube and oxygen to exit a concentric tube surrounding said central tube and controlling flow of oxygen and fuel to a maximum velocity of 600 feet per second as they exit the burner;

confining and directing said flame in a precombustor having generally a cylindrical shaped passage wall extending for a distance from a point where said flame is generated to a point where said flame can be introduced into a heating device, said distance (length) being determined from the ratio of length of the passage wall of the precombustor to diameter of the passage wall being between 2 and 6 and at a rate of heat generation between 0.25 and 40 million Btu/hour; and fixing said maximum velocity and ratio so that only an oxy-fuel flame of the type wherein a core of a fuel-rich phase surrounded by an oxygen-rich sheath is created and extends throughout the length of said precombustor without combustion occurring on the wall forming the precombustor.

2. A method according to claim 1 wherein said rate of heat generation is between 0.25 and 1.5 million Btu/hour, said ratio is between 3.4 and 5.1, said length is between 12 and 18 inches and said diameter is between 3.0 and 3.5 inches.

3. A method according to claim 1 wherein said rate of heat generation is between 1.0 and 3.0 million Btu/hour, said ratio is between 3.0 and 4.5, said length is between 12 and 18 inches and said diameter is between 3.5 and 4.0 inches.

4. A method according to claim 1 wherein said rate of heat generation is between 2.0 and 6.0 million Btu/hour, said ratio is between 2.8 and 4.0, said length is between 12 and 18 inches and said diameter is between 4.0 and 4.5 inches.

5. A method according to claim 1 wherein said rate of heat generation is between 4.0 and 20.0 million Btu/hour, said ratio is between 2.0 and 6.0, said length is between 16 and 48 inches and said diameter is between 4.0 and 8.0 inches.

6. A method according to claim 1 wherein said flame has a maximum convergence or divergence angle measure at the point where said flame enters said precombustor, said angle measured relative to the longitudinal axis of said precombustor.

* * * * *